(12) United States Patent
Shimada et al.

(10) Patent No.: US 8,839,606 B2
(45) Date of Patent: Sep. 23, 2014

(54) ENGINE SYSTEM WITH REFORMER

(75) Inventors: Atsushi Shimada, Hitachinaka (JP); Takao Ishikawa, Hitachi (JP); Tadashi Sano, Ushiku (JP)

(73) Assignee: Hitachi, Ltd., Tokyo (JP)

( * ) Notice: Subject to any disclaimer, the term of this patent is extended or adjusted under 35 U.S.C. 154(b) by 595 days.

(21) Appl. No.: 13/141,704

(22) PCT Filed: Dec. 25, 2009

(86) PCT No.: PCT/JP2009/007245
§ 371 (c)(1),
(2), (4) Date: Aug. 4, 2011

(87) PCT Pub. No.: WO2010/073698
PCT Pub. Date: Jul. 1, 2010

(65) Prior Publication Data
US 2012/0110984 A1     May 10, 2012

(30) Foreign Application Priority Data

Dec. 25, 2008   (JP) ................. 2008-329000

(51) Int. Cl.
| | |
|---|---|
| *F01N 3/00* | (2006.01) |
| *F01N 1/00* | (2006.01) |
| *F02D 9/04* | (2006.01) |
| *F02M 25/12* | (2006.01) |
| *F02D 13/02* | (2006.01) |
| *C01B 3/32* | (2006.01) |
| *F02M 27/02* | (2006.01) |

(52) U.S. Cl.
CPC ............... *F02D 9/04* (2013.01); *Y02T 10/121* (2013.01); *F02M 25/12* (2013.01); *F02D 13/0234* (2013.01); *F01N 2240/30* (2013.01); *Y02T 10/18* (2013.01); *C01B 3/32* (2013.01); *F02M 27/02* (2013.01)

USPC ............ 60/292; 60/285; 60/286; 60/324

(58) Field of Classification Search
USPC .............. 60/285, 286, 292, 303, 295, 324
See application file for complete search history.

(56) References Cited

U.S. PATENT DOCUMENTS 7,275,367 B2 * 10/2007 Tamura et al. ............... 60/324
7,377,101 B2 *  5/2008 Mital et al. ................... 60/275

FOREIGN PATENT DOCUMENTS

| JP | 54-176017 U | 12/1979 |
| JP | 63-130663 U | 8/1988 |
| JP | 2006-144702 A | 6/2006 |
| JP | 2007-138781 A | 6/2007 |
| JP | 2008-31966 A | 2/2008 |

OTHER PUBLICATIONS

Japanese Office Action with English Translation dated Jul. 31, 2012 (four (4) pages).
International Search Report with English translation dated Feb. 2, 2010 (three (3) pages).

* cited by examiner

*Primary Examiner* — Thomas Denion
*Assistant Examiner* — Diem Tran
(74) *Attorney, Agent, or Firm* — Crowell & Moring LLP

(57) ABSTRACT

In an engine system with a reformer being installed in an exhaust pipe to reform a fuel, a control valve for controlling a flow rate of exhaust gas is provided downstream from an installed position of the reformer in the exhaust pipe. In the engine system with the reformer, since a part of the exhaust gas can be trapped in a space between the reformer and an engine chamber by closing the control valve during an exhaust stroke, the reforming efficiency of the reformer can be heightened.

8 Claims, 2 Drawing Sheets

ENGINE SYSTEM WITH REFORMER

FIELD OF THE INVENTION

The present invention relates to an engine system with a reformer.

BACKGROUND ART

In a system for producing hydrogen or the like from a fuel by reforming the fuel to be fed into an engine, it is expected to enhance hydrogen producing efficiency because it makes an exhaust heat recovery system of reforming the fuel with an endothermic reaction of the fuel by making use of engine exhaust heat. Further, in a system of reforming a hydrocarbon fuel such as gasoline to produce hydrogen from the fuel and feeding a resultant gas as reformed gas including the hydrogen to an internal combustion engine, it is expected to heighten engine efficiency because it provides a way for the engine to make such as reduction of pumping loss, enhancement of combustion efficiency and enhancement of combustion speed. In a system where a reformer is installed in an exhaust pipe of an internal combustion engine, since exhaust gas temperature of the engine varies depending on engine operating conditions, the reforming efficiency varies depending on the conditions. For example, a conventional engine system with a reformer is disclosed in patent document 1. The engine system in patent document 1 is constituted in such a manner that the reformer is installed in the exhaust pipe at some distance from the engine and the reformed gas produced from the reformer is fed to an intake pipe together with exhaust gas.

PRIOR ART DOCUMENT

Patent Document

Patent Document 1: JP-A-2007-138781

SUMMARY OF THE INVENTION

Tasks to be Solved by the Invention

In the system as disclosed in patent document 1, since the temperature of exhaust gas fed to the reformer lowers during low output operating conditions such as idling and low speed operation, it is difficult to obtain a high reforming efficiency. For this reason, it is necessary to increase contacting area between exhaust gas and the reformer for heightening the reforming efficiency in a broad operating range, which arises a problem of enlarging the reformer.

An object of the present invention is to provide an engine system with a reformer that permits to enhance the amount of exhaust heat recovery from an engine to a reactor and to reduce the size of the reformer.

Measure for Solving the Tasks

In an engine system with a reformer being installed in an exhaust pipe to reform a fuel, the present invention is characterized in that a control valve for controlling a flow rate of exhaust gas is provided downstream from an installed position of the reformer in the exhaust pipe.

Advantages of the Invention

According to the present invention, since a part of the exhaust gas can be trapped in a space between the reformer and an engine chamber by closing the control valve during an exhaust stroke, the reforming efficiency of the reformer can be heightened. Thereby, since reformed gas of predetermined amount is permitted to be produced in the reformer, the size of the reformer can be reduced.

EMBODIMENTS FOR CARRYING OUT THE INVENTION

Herein below, embodiments according to the present invention will be explained with reference to the drawings.

Figure 1:
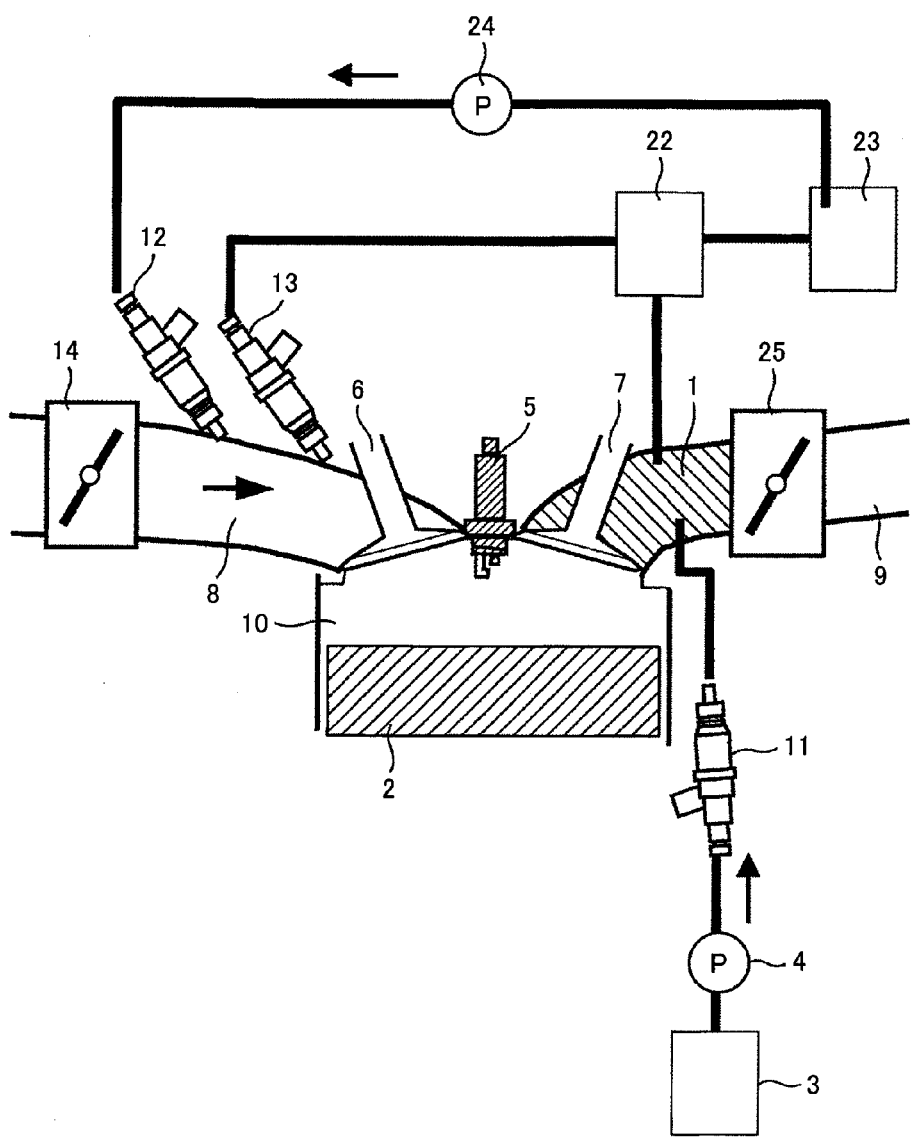
FIG. 1 is a constitutional diagram of the present system.

FIG. 1 is a constitutional diagram of the present system. In the present system, a reformer 1 is disposed in an exhaust pipe 9 near an exhaust valve 7. With regard to the position in the exhaust pipe 9 where the reformer 1 is provided, the reformer 1 is installed either at an engine head near the exhaust valve 7 or just downstream from the engine head in the exhaust pipe. Further, a control valve 25 for controlling a flow rate of the exhaust gas is disposed downstream from the installed position of the reformer in the exhaust pipe 9 where the reformer 1 is disposed. Pre-reformed fuel is filled in a pre-reformed fuel tank 3, and it is fed to the reformer 1 from a pre-reformed fuel control device 11 via a pre-reformed fuel pump 4. Post-reformed fuel having been reformed with the reformer 1 is separated into hydrogen rich gas and dehydrogenated fuel by a gas-liquid separating device 22. The dehydrogenated fuel is recovered into a dehydrogenation fuel tank 23. The hydrogen rich gas is fed from a hydrogen rich gas control device 13 to an engine intake pipe 8. According to such an arrangement, since the reformer 1 is provided in the exhaust pipe at a position near the exhaust valve 7, combustion gas immediately after exhausted from the inside of an engine cylinder 10 is fed to the reformer 1, thus engine exhausted gas heat with high temperature can be fed to the reformer. Still further, since the flow rate of the exhaust gas is controlled with the control valve 25 disposed downstream from the reformer 1 in an exhaust gas passage, the amount of the exhaust gas heat provided to the reformer 1 can be also controlled with the control valve 25.

The engine intake pipe 8 is provided with a dehydrogenated fuel control device 12 that is to control the feeding amount of the dehydrogenated fuel separated by the gas-liquid separating device 22, thereby to permit feeding dehydrogenated fuel into the engine cylinder 10. An air flow rate control device 14 for controlling air flow rate is disposed in the engine intake pipe 8.

Each operation of such as an intake valve 6, the exhaust valve 7, the air flow rate control device 14, the pre-reformed fuel control device 11, the hydrogen rich gas control device 13, the control valve 25 and pumps 4 and 24 in the present system are controlled by a not illustrated electronic control device.

In the present system, pre-reformed fuel used therein is exampled as follows, namely, such as hydrocarbon series fuel including gasoline, light oil, lamp oil, heavy oil, decalin, cyclohexane, methyl cyclohexane, naphthalene, benzene and toluene, and substances capable of chemically releasing hydrogen through reforming reaction by a catalysis including ammonia, hydrogen peroxide, nitrogen and oxygen. For example, when using methyl cyclohexane as the pre-reformed fuel, the post-reformed fuel becomes hydrogen and toluene, and the hydrogen separated with the gas-liquid separating device 22 is fed to the engine intake pipe 8 via the hydrogen rich gas control device 13 and the toluene representing dehydrogenated fuel is recovered into the dehydrogenation fuel tank 23.

Figure 2:
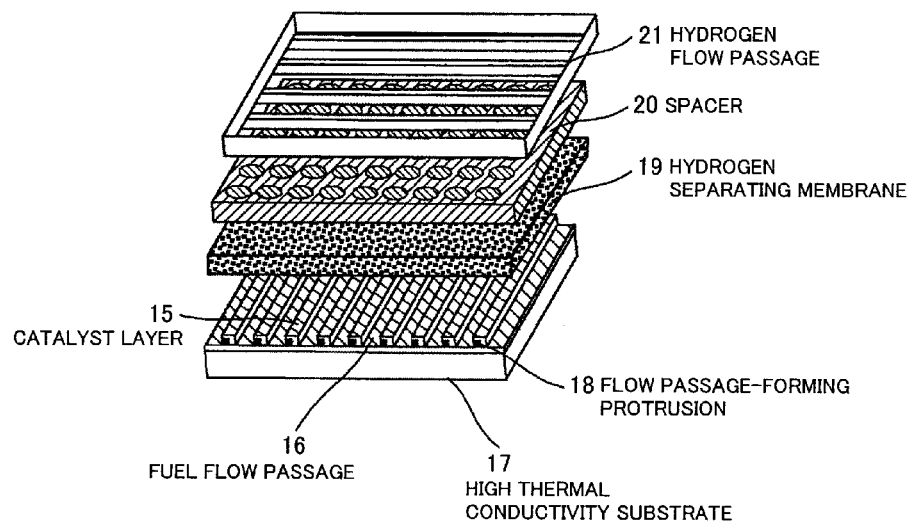
FIG. 2 is a structure diagram of a reformer.

Next, an exemplary constituted example of the reformer 1 will be explained with reference to FIG. 2. In the constitution of the reformer 1, a catalyst layer 15 comprising Pt/alumina catalyst is formed on a high thermal conductivity substrate 17 provided with a plurality of flow passage-forming protrusions 18 as shown in FIG. 2. A basic structure of the reformer 1 is constituted by laminating a hydrogen separating membrane 19 the catalyst layer 15 to selectively permit to pass only hydrogen therethrough and by laminating hydrogen passages 21 on the hydrogen separating membrane 19 via a spacer 20, and the reformer 1 is disposed in the engine exhaust pipe.

The medium fed to the reformer 1 passes through fuel flow passages 16 wherein the dehydrogenation reaction of the medium is advanced while the medium contacts to the catalyst layer 16 on the surface of the high thermal conductivity substrate 17 to thereby produce hydrogen rich gas. The produced hydrogen rich gas passes through the hydrogen separating membrane 19 and is discharged from the reformer 1 via the spacer 20 and through the hydrogen flow passages 21. Incidentally, the rest of hydrogen rich gas not being passed through the hydrogen separating membrane 19 and the dehydrogenated fuel are discharged outside of the reformer 1 through the fuel flow passages 16. Both the rest of hydrogen rich gas and the dehydrogenated fuel are merged with the hydrogen rich gas discharged from the hydrogen flow passages 21 and are mixed, thereafter, fed to the gas-liquid separating device 22 in FIG. 1. Further, as an alternative, another constitution can be acceptable in which the hydrogen rich gas discharged from the hydrogen flow passages 21 is fed to the hydrogen rich gas control device 13 without mixing with the fuel discharged from the fuel flow passages 16. Still further, when the hydrogen rich gas and the dehydrogenated fuel can be sufficiently separated by the hydrogen separating membrane 19 in the reformer 1, the gas-liquid separating device 22 as explained in connection with FIG. 1 can be omitted. Still further, although the constitution with the provision of the hydrogen separating membrane 19 is employed in FIG. 2 for performing efficiently the dehydrogenation reaction from the medium under a low temperature, a constitution with no provision of the hydrogen separating membrane 19 is also possible. Moreover, with regard to the basic structure shown in FIG. 2, the reformer 1 can be constituted by a plurality of stacked basic structures.

Figure 3:
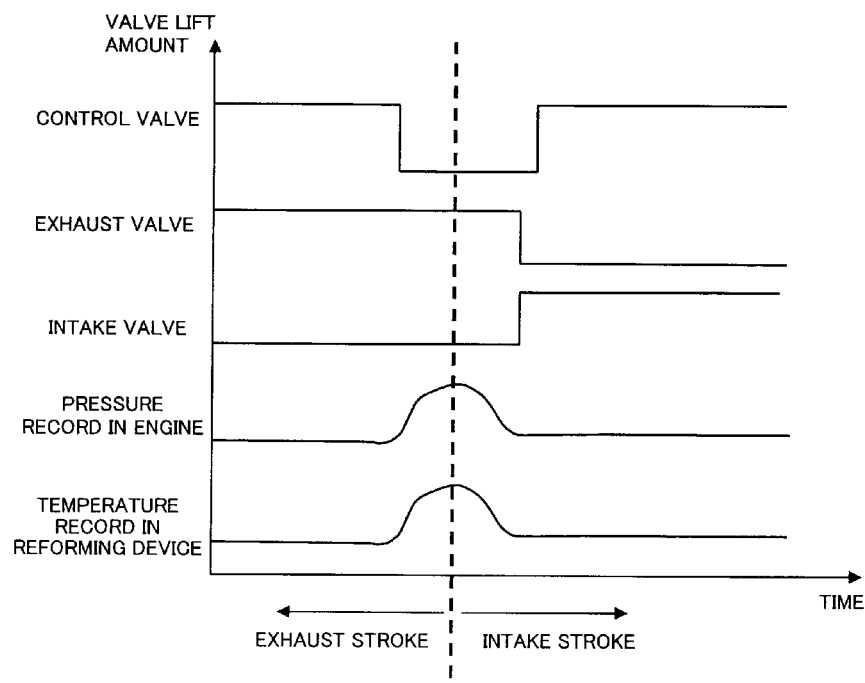
FIG. 3 is a control flow diagram of the system.

A time chart relating to the control of the present system is shown in FIG. 3. In FIG. 3, the abscissa represents engine cycle strokes, and the ordinates represent valve lift amounts of the control valve 25, the exhaust valve 7 and the intake valve 6, the pressure record in the engine and the temperature record in the reformer.

At first of the progress of the system, the control valve 25 is closed at a midway during exhaust stroke of the engine. At this moment, since the exhaust valve 7 is under open condition, the exhaust gas remains in the space between the engine cylinder 10 and the control valve 25 by closing the control valve 25 and the temperature and the pressure of the remaining exhaust gas enhance through compression by the piston. As a result, the amount of heat supply to the reformer 1 enhances. In the following intake stroke, the intake valve 6 is closed until a midway of the intake stroke and after the pressure in the engine cylinder 10 lowers near the atmospheric pressure by the downward movement of the piston and the gas expansion in the engine cylinder 10, the intake valve 6 is opened. When performing the opening and closing control of the intake valve 6 in such a manner, the loss work of compressed energy in the engine cylinder 10 after closing the control valve 25 during the exhaust stroke can be utilized as a work at the time of expansion by the piston during the following intake stroke. Thereby, a possible pumping loss can be reduced.

When the operation control as explained in connection with FIG. 3 is carried out, the remaining gas (exhaust gas) generated during the exhaust stroke is fed extending into the following cycle (intake cycle). Incidentally, in the case where the system uses a spark ignition type internal combustion engine using normal gasoline as fuel, if exhaust gas is returned over the predetermined amount thereof, misfire or reduction of engine efficiency may be caused. For this reason, the control valve 25 is closed after the engine exhaust valve 7 is closed. Further, in the present system, since the produced hydrogen is fed to the engine as a part of fuel reformed by the reformer 1, the misfire or reduction of engine efficiency due to the remaining exhaust gas can be prevented in comparison with when only gasoline is fed to the engine. This is because of the inherent characteristic of hydrogen capable of combusting rapidly in a lean state in comparison with gasoline. Further, there also exists a region where the engine efficiency enhances depending on the feeding amount of hydrogen to the engine under the existence of the remaining exhaust gas. This is because that: if only hydrogen is fed to the engine, since rapid combustion is effected in the engine, thereby cooling loss is increased and a region where the efficiency reduces appears; however, since such rapid combustion can be prevented by feeding the remaining exhaust gas, the engine efficiency is enhanced. Owing to such characteristic, the present system can realize the size reduction of the reformer 1 by making use of the remaining exhaust gas without lowering the system efficiency.

Further, when performing the operation as shown in FIG. 3 by executing the opening and closing control of the control valve 25, the most stable opening and closing control can be achieved by a method using the driving force of the engine. Specifically, the control valve 25 can be opened and closed via a rotating shaft connected to an engine crankshaft.

Still further, the amount of exhaust gas passing through the reformer varies depending on the closing timing of the control valve. Since moisture vapor in the exhaust gas is used for the reformation, the amount of reformed gas to be produced varies depending on the amount of exhaust gas, thereby the amount of reformed gas to be fed to the engine varies. When the feeding amount of the reformed gas varies, the amount of hydrogen as the main component in the reformed gas also varies. It is desirable in this instance to retard the more the ignition timing the more the containing amount hydrogen increases so as to optimize the engine ignition timing. For this reason, it is desirable to control the ignition timing in response to the closing timing of the control valve. Specifically, the more the closing timing of the control valve is retarded, the more the amount of exhaust gas passing through the reformer is increased. For this reason, it is desirable to perform a control to retard the engine ignition timing according to the retarding of the closing timing of the control valve.

EXPLANATION OF REFERENCE NUMERALS

1: Reformer, 2: Piston, 3: Pre-reformed fuel tank, 4: Pre-reformed fuel pump, 5: Ignition plug, 6: Intake valve, 7: Exhaust valve, 8: Intake pipe, 9: Exhaust pipe, 10: Inside of engine cylinder, 11: Pre-reformed fuel control device, 12: Dehydrogenated fuel control device, 13: Hydrogen rich gas control device, 14: Air flow rate control device, 15: Catalyst layer, 16: Fuel flow passage, 17: High thermal conductivity substrate, 18: Flow passage-forming protrusions, 19: Hydrogen separating membrane, 20: Spacer, 21: Hydrogen flow passage, 22: Vapor-liquid separating device, 23: Dehydrogenated fuel tank, 24: Dehydrogenated fuel pump, 25: Control valve.

The invention claimed is:

1. An engine system comprising:
an exhaust pipe;
a reformer that is installed in the exhaust pipe and that reforms a fuel; and
a control valve that controls a flow rate of exhaust gas and that is provided downstream from an installed position of the reformer in the exhaust pipe, wherein
engine ignition timing is controlled in response to the closing timing of the control valve.

2. The engine system according to claim 1, wherein opening and closing control of the control valve is carried out by using a driving force of the engine system.

3. The engine system according to claim 1, wherein the control valve is configured to be midway closed during an exhaust stroke and to be opened after an exhaust valve of the engine system is closed.

4. The engine system according to claim 3, wherein valve opening timing of an intake valve of the engine system is controlled in response to valve closing timing of the control valve.

5. An engine system comprising:
an exhaust pipe;
a reformer that is installed in the exhaust pipe and that reforms a fuel; and
a control valve that controls a flow rate of exhaust gas and that is provided downstream from an installed position of the reformer in the exhaust pipe, wherein
the control valve is configured to be midway closed during an exhaust stroke and to be opened after an exhaust valve of the engine system is closed.

6. The engine system according to claim 5, wherein engine ignition timing is controlled in response to the closing timing of the control valve.

7. The engine system according to claim 5, wherein opening and closing control of the control valve is carried out by using a driving force of the engine system.

8. The engine system according to claim 5, wherein valve opening timing of an intake valve of the engine system is controlled in response to valve closing timing of the control valve.

* * * * *